US010702820B2

(12) United States Patent
Neef et al.

(10) Patent No.: US 10,702,820 B2
(45) Date of Patent: *Jul. 7, 2020

(54) FILTER ELEMENT, IN PARTICULAR FOR GAS FILTRATION

(71) Applicant: MANN+HUMMEL GmbH, Ludwigsburg (DE)

(72) Inventors: Pascal Neef, Leonberg (DE); Pedro Miguel Pereira Madeira, Bietigheim-Bissingen (DE); Michael Heim, Charlotte, NC (US); Nadine Donauer, Fellbach (DE); Martin Wuebbeling, Mannheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,730

(22) Filed: Aug. 26, 2018

(65) Prior Publication Data

US 2018/0361296 A1 Dec. 20, 2018

Related U.S. Application Data

(63) Continuation of application No. PCT/EP2017/052960, filed on Feb. 10, 2017.

(30) Foreign Application Priority Data

Feb. 26, 2016 (DE) ........................ 10 2016 002 247

(51) Int. Cl.
*B01D 46/10* (2006.01)
*B01D 46/52* (2006.01)
*B01D 46/00* (2006.01)

(52) U.S. Cl.
CPC ....... *B01D 46/103* (2013.01); *B01D 46/0005* (2013.01); *B01D 46/10* (2013.01);
(Continued)

(58) Field of Classification Search
CPC ............... B01D 46/103; B01D 46/521; B01D 46/0005; B01D 2275/206; B01D 2271/02;
(Continued)

(56) References Cited

U.S. PATENT DOCUMENTS

2006/0174598 A1* 8/2006 Mills .................... B01D 46/002
55/499
2015/0007732 A1 1/2015 Hasenfratz et al.
(Continued)

FOREIGN PATENT DOCUMENTS

WO 2013093685 A1 6/2013

*Primary Examiner* — Robert Clemente
(74) *Attorney, Agent, or Firm* — James Hasselbeck (57) ABSTRACT

A filter element has a filter medium body with a first side and an oppositely positioned second side. A first sealing or supporting element is arranged at the first side. A second sealing or supporting element is arranged at the second side. The first side is positioned in a plane. The second side has a first section and a second section, wherein the first section has a first spacing relative to the first side and the second section has a second spacing relative to the first side, wherein the first and second spacings are different. One of the first and second sides is the inflow side of the filter medium body and the other one of the first and second sides is the outflow side of the filter medium body.

19 Claims, 5 Drawing Sheets

(52) U.S. Cl.
CPC ......... B01D 46/521 (2013.01); B01D 46/522 (2013.01); *B01D 2265/04* (2013.01); *B01D 2265/06* (2013.01); *B01D 2271/02* (2013.01); *B01D 2275/206* (2013.01)

(58) Field of Classification Search
CPC ........ B01D 2271/022; B01D 2271/027; B01D 2265/04; B01D 2265/06; B01D 46/523
See application file for complete search history.

(56) References Cited

U.S. PATENT DOCUMENTS

| | | |
|---|---|---|
| 2015/0013294 A1 | 1/2015 | Schmid et al. |
| 2015/0013542 A1 | 1/2015 | Hasenfratz et al. |
| 2018/0361294 A1* | 12/2018 | Neef ................. B01D 46/0002 |

* cited by examiner

FILTER ELEMENT, IN PARTICULAR FOR GAS FILTRATION

CROSS-REFERENCE TO RELATED APPLICATIONS

This application is a continuation application of international application No. PCT/EP2017/052960 having an international filing date of 10 Feb. 2017 and designating the United States, the international application claiming a priority date of 26 Feb. 2016 based on prior filed German patent application No. 10 2016 002 247.7, the entire contents of the aforesaid international application and the aforesaid German patent application being incorporated herein by reference.

BACKGROUND OF THE INVENTION

The invention concerns a filter element, in particular for gas filtration, for example, for an air filter, with a filter medium body at which a sealing or supporting element is arranged.

DE 10 2010 025 971 B4 discloses an air filter that is used for filtration of the intake air of internal combustion engines. The air filter comprises a filter medium body which is embodied as a folded filter and comprises adhesive beads for separating the raw side from the clean side. The adhesive beads fill the intermediate fold space in the lateral area of the folded filter and extend between the fold tips of the folded filter lying at the raw side and the clean side.

The filter element is received in a filter housing that is to be closed by a housing cover. At the inner side of the cover, a housing seal is disposed in a circumferentially extending groove and loads the filter element in the rim area at the clean side and pushes it into its seat in the receiving filter housing.

SUMMARY OF THE INVENTION

The invention has the object to embody a filter element with simple constructive measures in such a way that a high filtration efficiency is enabled.

This object is solved according to the invention in that a sealing or supporting element is arranged, respectively, at the inflow side and at the outflow side and in that the inflow side or the outflow side is positioned in a plane and the oppositely positioned side comprises at least two sections with different spacing relative to the inflow side or outflow side positioned in a plane. The dependent claims provide expedient further embodiments.

The filter element according to the invention is preferably used for gas filtration, for example, as air filter in the intake manifold of an internal combustion engine, preferably for a truck. However, a use of the filter element for liquid filtration is conceivable also.

The filter element comprises a filter medium body which is manufactured from a filter material and at which the filtration is taking place. A sealing or supporting element is arranged at the filter medium body at the inflow side as well as at the outflow side, respectively, by means of which the filter element is supported in the receiving filter housing and in a housing cover to be placed onto the filter housing.

By means of the sealing or supporting element, holding forces are introduced into the filter element or transmitted therethrough, wherein the holding forces are received at one side by the filter housing receiving the filter element and by the housing cover at the other end.

Either the inflow side or the outflow side is positioned in a plane while the oppositely positioned side comprises at least two sections with different spacing to the inflow side or outflow side positioned in a plane. Accordingly, the filter medium body comprises a flat-surface side, which either forms the inflow side or the outflow side, and, positioned opposite thereto, a side with different sections which correspondingly forms the outflow side or the inflow side. For example, the inflow side is positioned in a plane and the outflow side comprises at least two sections with different spacing to the inflow side.

This embodiment makes it possible to adapt the filter element to different installation situations in the filter housing in an optimal way. In this way, it is possible to fill the receiving space in the filter housing, into which the filter element is inserted, completely or at least substantially completely with the filter element, even in case of non-flat-surface inflow side or outflow side or in case of non-parallel inflow and outflow sides, so that a corresponding high degree of filling of the receiving space and an improved filtration efficiency of the filter device is realized. This makes it possible, for example, to employ non-parallelepipedal filter elements that are insertable into correspondingly shaped receiving spaces in the filter housing and substantially fill the receiving spaces. For example, channels, tubes or the like, which project into the receiving space in the filter housing and restrict it, can be taken into consideration. As a whole, the receiving space can be filled better with the filter element and the filter medium body, and the filtration efficiency can thus be increased.

According to an advantageous embodiment, the side which is positioned opposite the side positioned in a plane comprises a curved section by means of which, for example, an adaptation to a flow tube is possible through which the fluid is supplied or discharged. The curved section is in particular inwardly curved so that filter material of the filter medium body is cut out with a corresponding cross-sectional surface and the filter medium body, for example, can snugly fit around a tube or a channel projecting into the receiving space. The curvature of this section is, for example, of part-circular shape.

According to an advantageous embodiment, the side which is positioned opposite the side positioned in a plane comprises at least one section that is in particular directly lying between two outer sections and that, at least in one part of the section, comprises a smaller spacing relative to the inflow side or outflow side positioned in a plane than the two outer sections. This section that is in particular directly positioned between two outer sections can be embodied, further preferred, as a curved section as described above. With this embodiment, the at least one sealing or supporting element at the side which is positioned opposite the side positioned in a plane can be embodied non-continuous, in particular as two sealing or supporting element parts with different spacing to the inflow side or outflow side positioned in a plane, which in particular are arranged at the respective section with different spacing to the inflow side or outflow side positioned in a plane and/or correlated therewith. Due to this configuration, in particular strip-shaped sealing or supporting element parts, which in particular are arranged at different spacings to the inflow side or outflow side positioned in a plane, can be produced in one working step, advantageously by a casting process in at least one casting mold with a material that is foaming and/or hardens after casting, such as polyurethane. Further preferred, the outer sections can be planar sections, in particular sections parallel to each other and/or sections parallel to the inflow side positioned in a plane. In this way, the manufacture in one working step, in particular by liquid levels that are different but parallel during casting, is further facilitated. In this context, it is understood that the bottom sides, i.e., the end faces of the cast sealing or supporting elements parts which are facing away from the inflow side or outflow side positioned in a plane, can also be slightly angled relative to each other as long as a complete filling for the respective sealing or supporting element parts is achieved by the respective planar liquid level of the casting material that is horizontal relative to the force of gravity during manufacture.

The side which is positioned opposite the side positioned in a plane can also comprise two planar sections which optionally extend parallel to each other and parallel to the oppositely positioned side but comprise a different spacing relative to the oppositely positioned side. Inasmuch as a curved section is present at this side, it is extending preferably between the two planar sections. The two planar sections positioned with different spacing to the oppositely positioned side also enable an adaptation to a corresponding cross-sectional geometry of the receiving space in the filter housing.

Moreover, further geometries for the side at the filter medium body which is positioned opposite the inflow side or outflow side positioned in a plane are possible. For example, embodiments are conceivable in which the inflow side as well as the outflow side are planar but positioned at an angle relative to each other and are thus not lying parallel to each other. It is also possible to provide two or more planar sections at one side which are positioned relative to the oppositely positioned side at an angle but are not lying in a common plane and instead parallel displaced relative to each other or angularly relative to each other. Finally, also embodiments are conceivable in which a plurality of curved sections, but with different or oppositely oriented curvature, are provided, optionally combined with planar sections.

The sealing or supporting element at the planar inflow side or outflow side is advantageously embodied so as to extend circumferentially and encloses the planar inflow side or outflow side in its rim area. The oppositely positioned side with at least two sections with different spacing to the planar side can optionally also be enclosed by a circumferentially extending sealing or supporting element. However, it is also possible to arrange at least at one side, preferably at the side with at least two sections with different spacing to the oppositely positioned planar side, a sealing or supporting element that is embodied non-continuous. Inasmuch as a curved section is provided, the latter is advantageously without the sealing or supporting element, even though embodiments are also possible in which also the curved section is framed laterally by a sealing or supporting element.

In an advantageous embodiment, at the outer side of the filter medium body at least one adhesive bead extending between the sealing or supporting elements, for example, a glue bead, is arranged. The adhesive bead is located in particular at or adjacent to an outer side of the filter medium body and extends between the sealing or supporting elements at the inflow side and outflow side of the filter medium body. The at least one adhesive bead forms a force-transmitting part extending between the oppositely positioned sealing or supporting elements. In this embodiment, the filter medium body is relieved from the holding forces which are acting upon insertion of the filter element into the receiving filter housing and placement of the housing cover onto the filter element. By placing the housing cover onto the filter housing, a force is usually generated which pushes the filter element into its seat in the filter housing and which is transmitted through the sealing and supporting elements as well as the intermediately positioned adhesive bead. In this way, the filter medium body of the filter element is relieved from forces so that also the risk of damaging the filter element is reduced and the service life of the filter element is increased.

According to a further advantageous embodiment, the filter medium body is embodied as a folded filter whose fold tips are lying at the inflow side and at the outflow side. Accordingly, the end face edges of the folds are positioned at an angle to the inflow side and outflow side of the filter medium body. Inasmuch as an adhesive bead is arranged at the filter medium body, it fills advantageously a plurality of intermediate fold spaces and forms an end face edge adhesive connection across a plurality of end face edges, whereby a stabilization of the folds is also achieved in addition to the force transmission between the sealing or supporting elements at the inflow side or outflow side. Providing the end face edge adhesive connection exclusively in the intermediate fold spaces facing the inflow side is conceivable as well as providing the end face edge adhesive connection in the intermediate fold spaces facing the inflow side as well as the outflow side.

In an alternative embodiment, the filter medium body is embodied as a block filter without filter folds. In this case, at or adjacent to the outer side of the filter medium body, one or several adhesive beads can extend also between the sealing or supporting elements at the inflow side and the outflow side.

According to a further advantageous embodiment, the at least one sealing or supporting element arranged at the inflow side is spaced apart from the at least one sealing or supporting element arranged at the outflow side. This means in particular that no immediate mechanical connection between sealing or supporting elements arranged at the inflow side and sealing and sealing or supporting elements arranged at the outflow side is existing but only an indirect connection through the filter medium body and/or components arranged in the filter medium body, in particular an end face edge adhesive connection. The spacing between sealing or supporting elements arranged at the inflow side and sealing or supporting elements arranged at the outflow side is preferably substantially defined by the local spacing between inflow side and the outflow side and, in an advantageous further embodiment, since preferably on both sides the sealing or supporting elements are arranged close to the inflow side or outflow side, can amount in particular to at least respectively 70%, preferably at least respectively 80%, particularly preferred at least 90%, of the local spacing between inflow side and outflow side.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
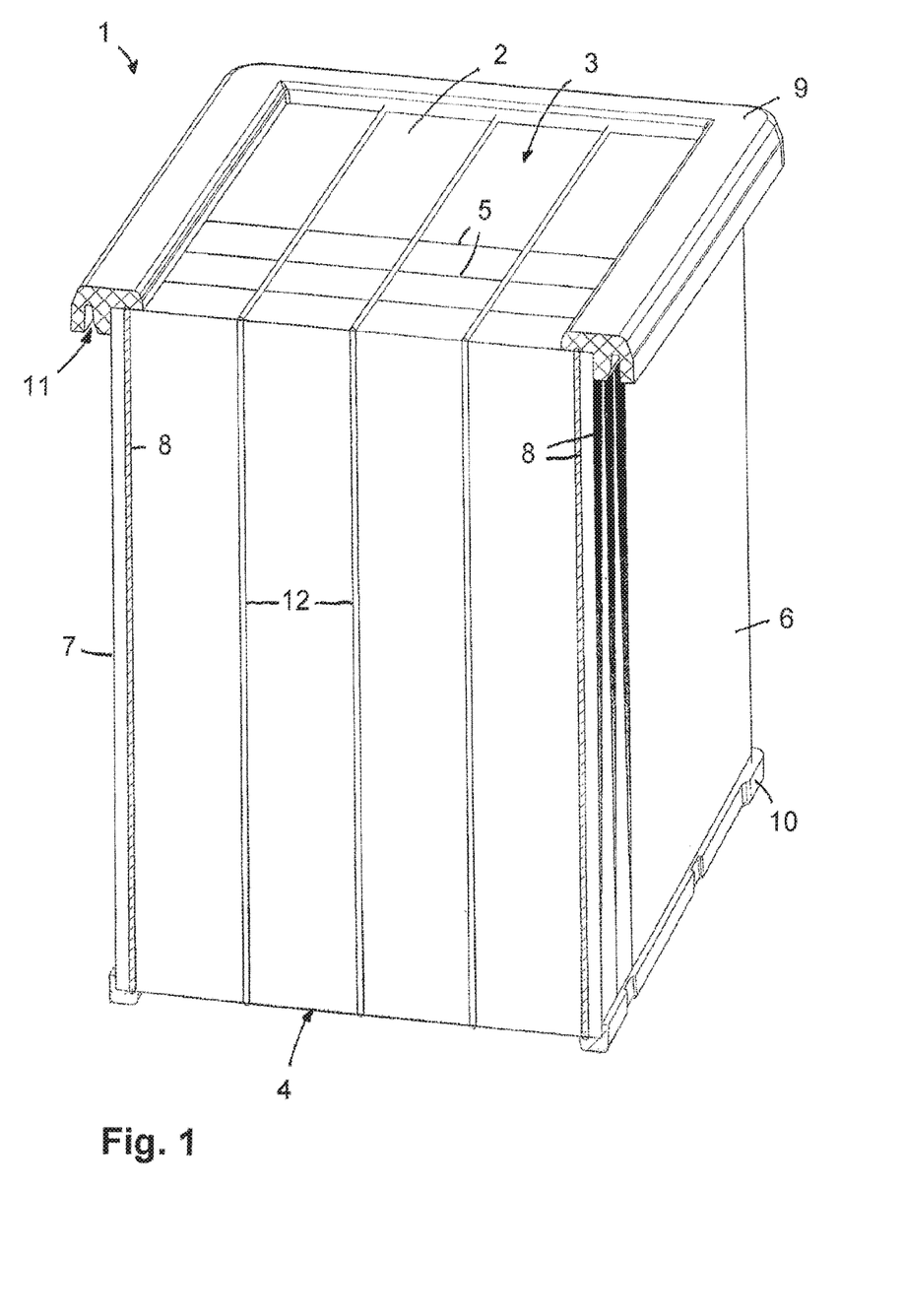
FIG. 1 shows in perspective view a filter element with a filter medium body embodied as a folded filter which at the inflow side as well as at the outflow side comprises a sealing or supporting element, respectively, wherein at the outer side of the filter medium body adhesive beads are introduced into the filter folds which extend between the oppositely positioned sealing or supporting elements.

In FIG. 1, a filter element 1 is illustrated that, for example, can be used for air filtration of combustion air to be supplied to an internal combustion engine in a vehicle such as, for example, a truck. The filter element 1 comprises a filter medium body 2 of a filter material at which the filtration takes place. The flow through the filter element 1 is realized via the inflow side 3 at the top, in accordance with the illustration of FIG. 1, in the direction of the outflow side 4 at the bottom.

The filter medium body 2 is designed as a folded filter and comprises a plurality of filter folds whose fold tips 5 are lying at the inflow side 3 and at the oppositely positioned outflow side 4 and whose end face edges are facing the lateral outer sides 6 and 7 of the filter medium body. Adjacent to the lateral outer sides 6, 7, adhesive beads 8 are arranged at the filter medium body 2 which fill the filter folds that are open toward the inflow side 3. The lateral adhesive beads 8 close off the filter folds at the outer sides 6 and 7 and ensure an axial flow through the filter medium body 2 from the inflow side 3 to the outflow side 4. Moreover, the adhesive beads 8 stabilize the folds of the filter medium body.

At the inflow side 3, there is a first sealing or supporting element 9 that is embodied to extend circumferentially and is arranged in the rim area so that the entire inflow side 3 positioned in a plane is framed by the sealing or supporting element 9. At the oppositely positioned outflow side 4 there is also a sealing or supporting element 10 that also is arranged in the rim area and is embodied to extend circumferentially. The two sealing or supporting elements 9, 10 extend each in the rim area at the inflow side 3 or outflow side 4 and cover the respective end face edge of each adhesive bead 8. In this way, an axial force transmission between inflow side and outflow side 3, 4 between the sealing or supporting elements 9, 10 through the laterally extending adhesive beads 8 is ensured. In particular in the installed position in the receiving filter housing and with attached housing cover which loads the filter element 1 with pressure, absorption of the holding forces through the oppositely positioned sealing or supporting elements 9, 10 and the intermediately positioned adhesive beads 8 is ensured so that the filter material of the filter medium body 2 is relieved of these holding forces.

Advantageously, the sealing or supporting elements 9, 10 are applied immediately to the filter medium body 2, for example, by casting or injection molding. The sealing or supporting elements 9, 10 are comprised, for example, of PUR material. Both sealing or supporting elements 9, 10 are positioned in immediate contact with the respective end face edges of the adhesive beads 8 and extend also to the outer sides 6 and 7 against which the adhesive beads 8 are resting as well as the forwardly and rearwardly positioned outer sides of the filter medium body 2 which, as a whole, is of a parallelepipedal shape. The inflow side 3 as well as the outflow side 4 are each embodied planar or areal; inflow side and outflow side are lying parallel to each other.

In the sealing or supporting element 9 positioned at the inflow side 3 a circumferentially extending receiving groove 11 for a seal is provided. The receiving groove 11 is located in a section of the sealing or supporting element 9 which is projecting laterally past the outer side of the filter medium body 2. The receiving groove 11 is embodied open in the direction of the oppositely positioned outflow side 4.

Between the outwardly positioned adhesive beads 8 additional adhesive beads 12 are provided at the filter medium body 2 which extend parallel to the outwardly positioned adhesive beads 8 forming an end face edge adhesive connection and which divide the filter folds of the filter medium body 2 into chambers. The adhesive beads 12 can be embodied continuous or optionally can be embodied interrupted.

Instead of a seal, a projection of the receiving filter housing can also project into the receiving groove 11 at the sealing or supporting element 10.

Figure 2:
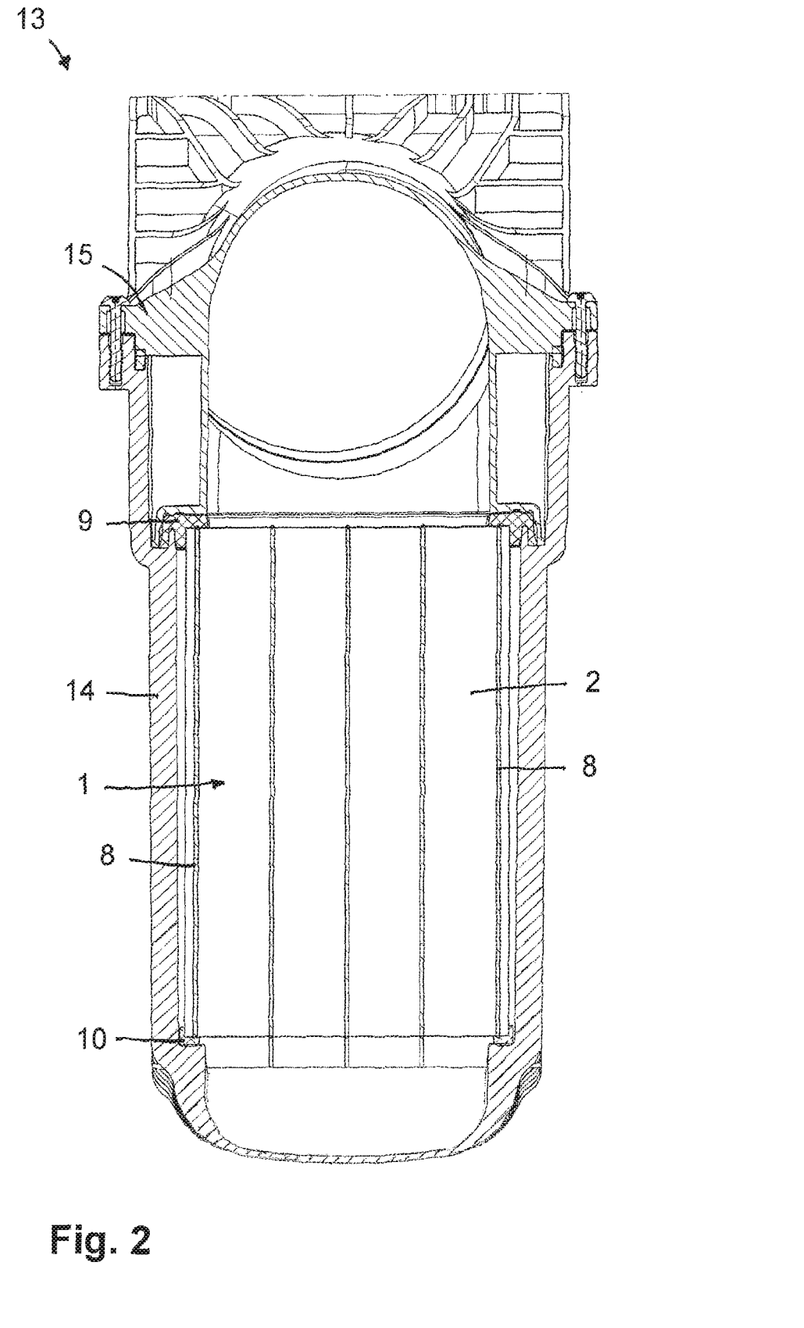
FIG. 2 shows a filter device with a filter housing and a housing cover, wherein in the filter housing a filter element according to FIG. 1 is received.

In FIG. 2, a filter device 13 with a filter housing 14 and the filter element 1 received in the filter housing 14 is illustrated. The filter housing 14 is closed by a housing cover 15 wherein a sealing element is arranged for sealing between filter housing 14 and housing cover 15. The filter element 1 is supported with its lower sealing or supporting element 10 at the bottom of the receiving filter housing 14 while the oppositely positioned upper sealing or supporting element 9 is force-loaded by the housing cover 15. The holding force which is exerted thereby is transmitted through the upper sealing or supporting element 9 and the adhesive beads 8 into the lower sealing or supporting element 10 and farther into the receiving filter housing 14.

Figure 3:
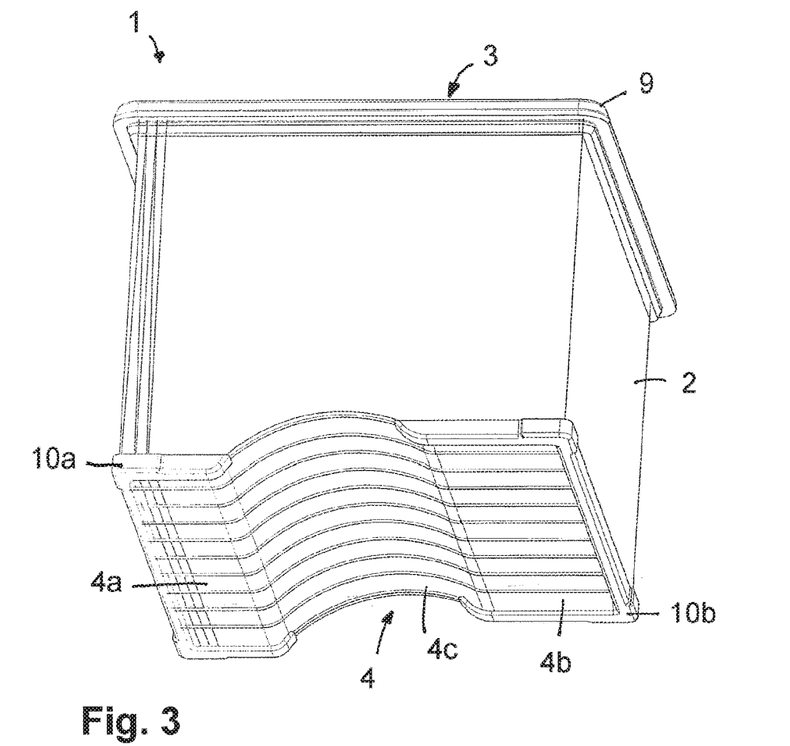
FIG. 3 shows a filter element in an alternative embodiment in which the outflow side is comprised of two planes parallel to the inflow side, but at different spacing, and an intermediately positioned part-circular curved section.
Figure 4:
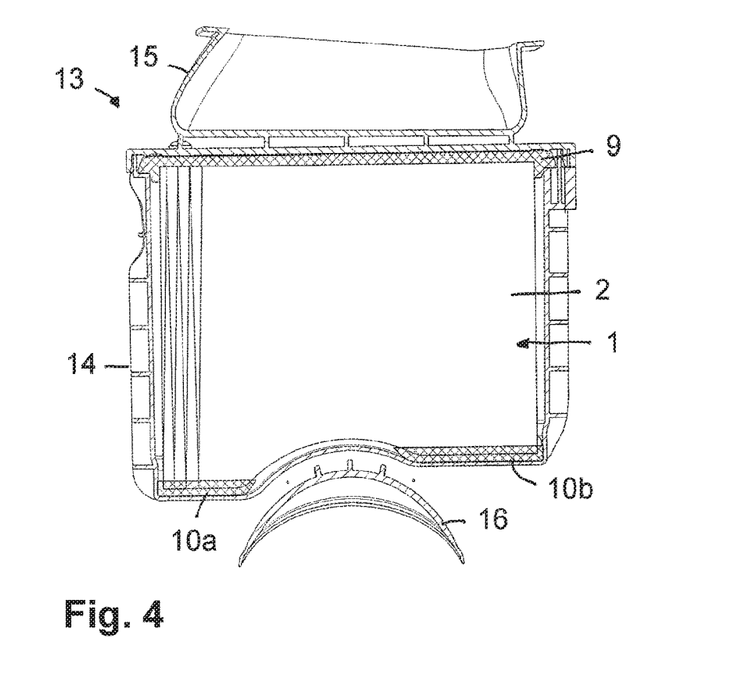
FIG. 4 shows a filter device with the filter element according to FIG. 3 in section view.

FIG. 3 shows the filter element 1 in an embodiment variant in which the outflow side 4 of the filter medium body 2 is different in comparison to the embodiment according to FIG. 1. In FIG. 3, the filter medium body 2 is also embodied as a folded filter and adhesive beads that form an end face edge adhesive connection extend at the outer sides between the sealing or supporting element 9 at the inflow side 3 and the sealing or supporting element 10a, 10b at the outflow side 4. The inflow side 3 is embodied planar, the outflow side 4, on the other hand, comprises two outwardly positioned planar sections 4a and 4b and an intermediately positioned, inwardly curved section 4c. The two outwardly positioned sections 4a, 4b are positioned at different levels and thus have a different spacing to the inflow side 3 relative to which the outwardly positioned outflow side sections 4a, 4b extend parallel. The central curved section 4c is in particular of a part-circular shape and serves to receive a housing-associated outflow tube 16, as shown in particular in FIG. 4. This makes it possible, as illustrated in FIG. 4, to fill the receiving space in the filter housing 14 in an optimal way so that no housing-associated unused empty spaces are generated. Due to the curvature, the spacing relative to the oppositely positioned inflow side 3 changes within the central section 4c of the outflow side 4 as a function of the actual position between the outwardly positioned planar sections 4a and 4b.

At the outflow side, the sealing or supporting element is of a two-part configuration with a first part 10a at the outflow side section 4a and a second part 10b at the outflow side section 4b. Each part 10a, 10b is embodied U-shaped and frames the sections 4a, 4b at the three outwardly positioned sides. There is however no sealing or supporting element at the transition between the outwardly positioned sections 4a and 4b along the central section 4c that is embodied curved.

The adhesive beads at the outer side extend between the upper sealing or supporting element 9 and the two lower outflow side sealing or supporting element parts 10a and 10b. In this way, despite the multi-part configuration of the outflow side sealing or supporting element a force transmission between inflow side and outflow side through the adhesive beads positioned at the outer sides is ensured.

Figure 5:
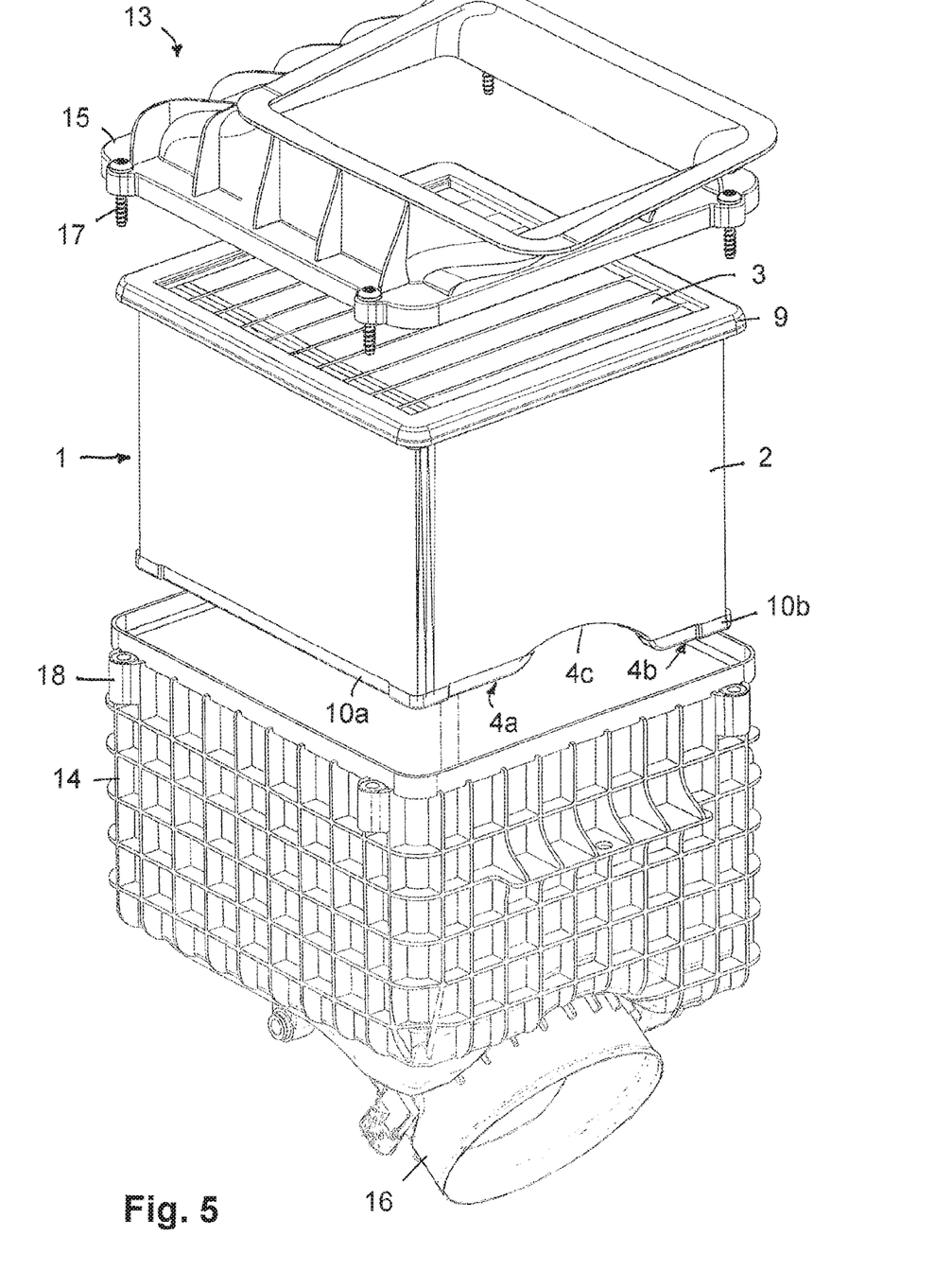
FIG. 5 shows a filter device with the different components in exploded illustration.

In FIG. 5 a filter device 13 with its components is shown in exploded illustration. The filter device 13 corresponds to that of FIG. 4 and comprises a filter element 1 according to FIG. 3 with a planar inflow side 3 and an outflow side 4 with planar but height-displaced sections 4a and 4b and an intermediately positioned curved section 4c. The housing cover 15 is screwed by screws 17 to the filter housing 14 which for this purpose comprises housing eyes 18 into which the screws 17 are screwed.

Figure 6:
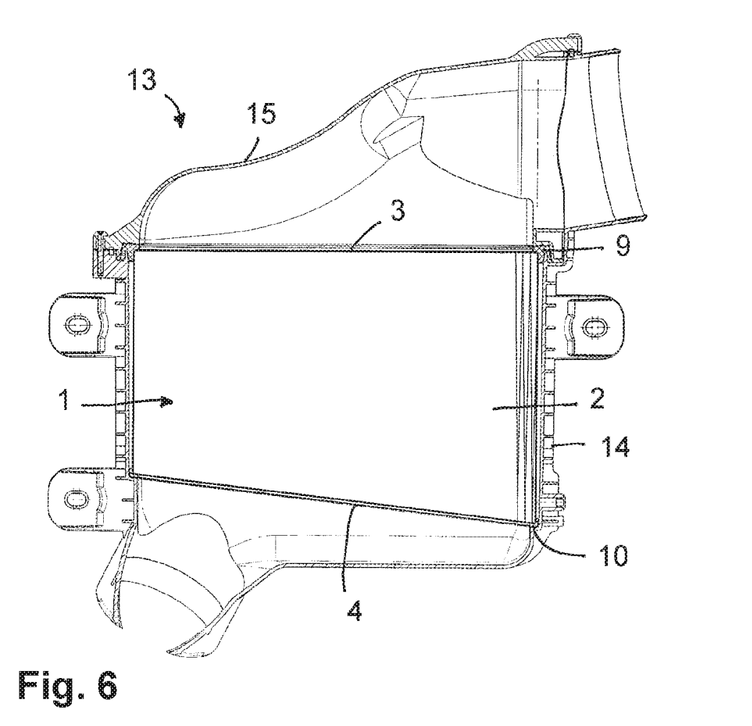
FIG. 6 shows a filter device with a filter element in a further embodiment variant in which the inflow side and outflow side each are embodied flat-surfaced but are oriented at an angle relative to each other.

In FIG. 6, a further embodiment with a filter element 1 inserted into a filter housing 14 is illustrated that comprises two flat-surface inflow and outflow sides 3, 4, planar as such, which however are positioned angularly relative to each other. The inflow side 3 is positioned, relative to the insertion direction into the filter housing 14, orthogonally to the filter housing while the outflow side 4 is extending at an angle deviating from 90° relative to the insertion direction. The filter medium body 2 of the filter element 1 is embodied as a folded filter which, in the upper and lower rim areas, is framed respectively by a sealing or supporting element 9, 10 wherein holding forces between the housing cover 15 and the filter housing 14 are transmitted by lateral adhesive beads. FIG. 6 also shows an inflow tube for supply of raw air in the housing cover 15 and an outflow tube for discharging purified air at the bottom of the filter housing 14.

Figure 7:
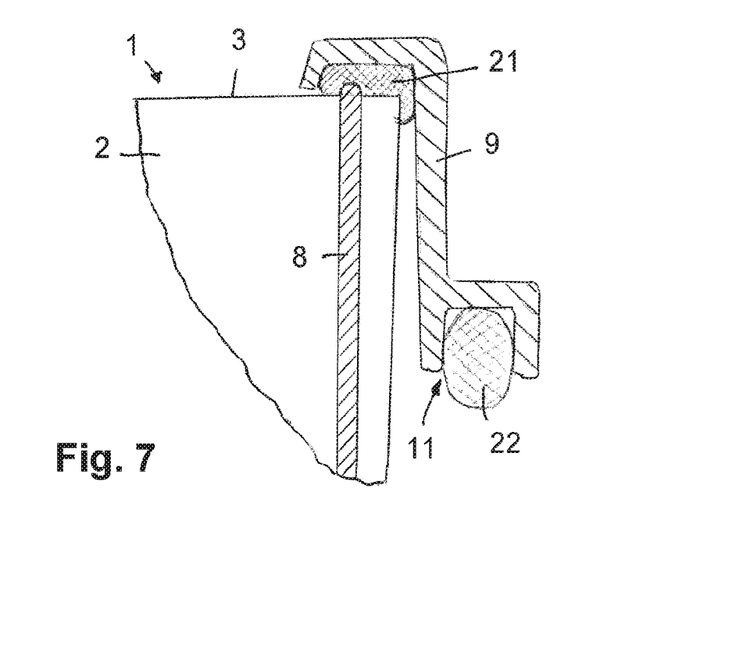
FIG. 7 shows a section through the lateral area of a filter element of a further embodiment.

In the embodiment according to FIG. 7, the sealing or supporting element 9 at the inflow side 3 of the filter medium body 2 is not in direct contact with the end face edge of the adhesive bead 8. Instead, a seal 21 is provided between the end face edge of the adhesive bead 8 and the sealing or supporting element 9 and extends across the rim area of the filter medium body 2 and is in immediate contact with the adhesive bead 8. The sealing or supporting element 9 engages across the seal 21 so that holding forces acting on the sealing or supporting element 9 are transmitted through the seal 21 onto the adhesive bead 8.

FIG. 7 also shows that the part of the sealing or supporting element 9 projecting past the outer side of the filter medium body 2 comprises the receiving groove 11 into which a further seal 22 is inserted. In the mounted state, the seal 22 is resting against a shoulder in the filter housing.

What is claimed is:

1. A filter element comprising:
a filter medium body comprising a first side and an oppositely positioned second side;
a first sealing or supporting element arranged at the first side;
a second sealing or supporting element arranged at the second side;
wherein the first side is positioned in a plane;
wherein the second side comprises
a first section and further comprises
a second section,
wherein the first section has a first spacing relative to the first side and the second section has a second spacing relative to the first side,
wherein the first and second spacings are different;
wherein one of the first and second sides is the inflow side of the filter medium body and the other one of the first and second sides is the outflow side of the filter medium body,
wherein an axial direction, as used herein, is a direction from the first side to the second side of the filter medium body;
wherein the filter medium body has at least one of lateral side extending from the first side to the second side of the filter medium body,
wherein a rim edge is formed where the first side or the second side meet the at least one of lateral side;
wherein the first sealing or supporting element and the second sealing or supporting element are arranged at the rim edge of the filter medium body;
wherein the second side further comprises:
at least one third section and the at least one third section comprises:
at least one part with a third spacing relative to the first side,
wherein the third spacing is smaller than the first spacing and smaller than the second spacing; and
wherein the second sealing or supporting element does not extend across the at least one third section.

2. The filter element according to claim 1, wherein the second sealing or supporting element is embodied to be non-continuous.

3. The filter element according to claim 1, wherein the first side is the inflow side and the second side is the outflow side.

4. The filter element according to claim 1, wherein The at least one third section of the second side is at least one curved section.

5. The filter element according to claim 1, wherein the at least one third section is directly positioned between the first and second sections.

6. The filter element according to claim 5, wherein the at least one third section is a curved section.

7. The filter element according to claim 1, wherein the first and second sections are planar sections extending parallel to each other.

8. The filter element according to claim 1, wherein the first and second sections are planar sections extending parallel to the first side.

9. The filter element according to claim 1, wherein the first and second sections are planar sections extending parallel to each other and extending parallel to the first side.

10. The filter element according to claim 1, wherein the filter medium body is a folded filter having a plurality of filter folds.

11. The filter element according to claim 1, wherein at least one of the first and second sealing or supporting elements is comprised of a PUR material.

12. The filter element according to claim 1, wherein at least one of the first and second sealing or supporting elements is applied immediately to the filter medium body.

13. The filter element according to claim 1, wherein at least one of the first and second sealing or supporting elements engages about at least one edge of the filter medium body.

14. The filter element according to claim 1, wherein at least one of the first and second sealing or supporting elements is strip-shaped.

15. The filter element according to claim 1, wherein the first sealing or supporting element is spaced apart from the second sealing or supporting element.

16. A filter device comprising:
a filter element according to claim 1; and
a filter housing configured to receive the filter element.

17. A filter element comprising:
a filter medium body comprising a first side and an oppositely positioned second side;
a first sealing or supporting element arranged at the first side;
a second sealing or supporting element arranged at the second side;
wherein the first side is positioned in a plane;
wherein the second side comprises
a first section and further comprises
a second section,
wherein the first section has a first spacing relative to the first side and the second section has a second spacing relative to the first side,
wherein the first and second spacings are different;
wherein one of the first and second sides is the inflow side of the filter medium body and the other one of the first and second sides is the outflow side of the filter medium body;
wherein an axial direction, as used herein, is a direction from the first side to the second side;
the filter element further comprising
at least one adhesive bead arranged at an outer side of the filter medium body and extending in the axial direction between the first and second sealing or supporting elements,
wherein the at least one adhesive bead forms a force transmitting part, transmitting forces through the at least one adhesive bead from the first sealing or supporting element to the second sealing or supporting element of the filter medium body.

18. The filter element according to claim 17, wherein the filter medium body is a folded filter and
wherein the at least one adhesive bead forms an end face edge adhesive connection extending across a plurality of end face edges of the folded filter.

19. The filter element according to claim 17, wherein the filter medium body is a folded filter having a plurality of filter folds;
wherein the at least one adhesive bead is arranged on the filter medium body between adjacent filter folds and fills a gap between the adjacent filter folds, the at least one adhesive bead is arranged adjacent to a respective one of the at least one of lateral side of the filter body.

* * * * *